US011447263B2

(12) United States Patent
O'Connor et al.

(10) Patent No.: US 11,447,263 B2
(45) Date of Patent: Sep. 20, 2022

(54) FUEL OXYGEN REDUCTION UNIT CONTROL SYSTEM

(71) Applicant: General Electric Company, Schenectady, NY (US)

(72) Inventors: Ethan Patrick O'Connor, Hamilton, OH (US); Daniel Alan Niergarth, Norwood, OH (US); Brandon Wayne Miller, Liberty Township, OH (US); Sridhar Adibhatla, Glendale, OH (US)

(73) Assignee: General Electric Company, Schenectady, NY (US)

( * ) Notice: Subject to any disclaimer, the term of this patent is extended or adjusted under 35 U.S.C. 154(b) by 528 days.

(21) Appl. No.: 16/179,000

(22) Filed: Nov. 2, 2018

(65) Prior Publication Data

US 2020/0140112 A1     May 7, 2020

(51) Int. Cl.
*B64D 37/34*     (2006.01)
*F02M 37/22*     (2019.01)
(Continued)

(52) U.S. Cl.
CPC .............. *B64D 37/34* (2013.01); *F02C 7/222* (2013.01); *F02C 7/224* (2013.01); *F02C 7/232* (2013.01);
(Continued)

(58) Field of Classification Search
CPC ......... B64D 37/34; F02M 37/22; F02C 7/232; F02C 7/22; B60K 3/04; B01D 19/0063; B01D 2257/104
See application file for complete search history.

(56) References Cited

U.S. PATENT DOCUMENTS 2,582,842 A    1/1952  Messinger
2,720,313 A   10/1955  Pattison
(Continued)

FOREIGN PATENT DOCUMENTS

EP    2003311 A2   12/2008
EP    3018304 A1    5/2016
(Continued)

OTHER PUBLICATIONS

U.S. Appl. No. 15/819,327, filed Nov. 28, 2017.
(Continued)

*Primary Examiner* — Youngsul Jeong
(74) *Attorney, Agent, or Firm* — Dority & Manning, P.A.

(57) ABSTRACT

A method of operating a fuel oxygen reduction unit for a vehicle or a gas turbine engine of the vehicle is provided. The fuel oxygen reduction unit including a contactor and a fuel gas separator, and further defining a stripping gas flowpath in flow communication with a stripping gas inlet of the contactor and a stripping gas outlet of the fuel gas separator. The method includes receiving data indicative of a parameter of a stripping gas flow through the stripping gas flowpath or of a component in flow communication with the stripping gas flow through the stripping gas flowpath; and determining an operability condition of the fuel oxygen reduction unit, or a component operable with the fuel oxygen reduction unit, based on the data received indicative of the parameter of the stripping gas flow or of the component in flow communication with the stripping gas flow.

16 Claims, 4 Drawing Sheets

(51) Int. Cl.
  *F02C 7/22* (2006.01)
  *F02C 7/224* (2006.01)
  *F02C 7/232* (2006.01)
  *B01D 19/00* (2006.01)
(52) U.S. Cl.
  CPC ......... *F02M 37/22* (2013.01); *B01D 19/0063* (2013.01); *B01D 2257/104* (2013.01); *F05D 2210/13* (2013.01)

(56) References Cited

U.S. PATENT DOCUMENTS

| | | |
|---|---|---|
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,315,815 B1 * | 11/2001 | Spadaccini ............ B01D 53/22 95/46 |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Comet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 * | 6/2017 | Johnson ............ B01D 19/0005 |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 2008/0095681 A1 | 4/2008 | Koenig et al. |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0262309 A1 | 10/2011 | Limaye et al. |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0331857 A1 | 11/2014 | Massey et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 * | 6/2016 | Lo ..................... B01D 19/0068 96/187 |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |
| 2018/0016025 A1 | 1/2018 | Rheaume et al. |
| 2018/0056233 A1 | 3/2018 | Henson et al. |
| 2018/0056234 A1 | 3/2018 | Weng et al. |

(56) References Cited

U.S. PATENT DOCUMENTS

| 2018/0071659 A1 | 3/2018 | Rhoden |
| 2018/0118367 A1 | 5/2018 | Rheaume et al. |
| 2020/0086239 A1 | 3/2020 | Cordatos et al. |

FOREIGN PATENT DOCUMENTS

| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

OTHER PUBLICATIONS

U.S. Appl. No. 15/819,443, filed Nov. 21, 2017.
Landfill, Sewage, Biogas, Coal, Seam & Mines Gas Separation/Filtration, Kelburn Engineering—LandfillGas and Air Separation, 3 pages. www.kelburneng.com.uk/landfill~gas~bio~gas~sewer~gas.php.

\* cited by examiner

FUEL OXYGEN REDUCTION UNIT CONTROL SYSTEM

FIELD

The present subject matter relates generally to a fuel oxygen reduction unit for an engine and a method of operating the same.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen reduction systems have been proposed for such a purpose.

Downstream of the fuel oxygen reduction systems, the gas turbine engines may include one or more fuel oxygen sensors to ensure the fuel oxygen reduction system is operating at a desired level. However, the inventors of the present disclosure have found that in the event that such fuel oxygen sensor(s) fail or are otherwise not providing accurate information, damage may be caused to, e.g., the gas turbine engine through continued use of the fuel as a heat sink without such fuel having a sufficient amount of oxygen removed therefrom.

Accordingly, the inventors have found that a fuel oxygen reduction system having one or more backup systems for determining an oxygen level of a fuel flow downstream of the fuel oxygen reduction system would be useful.

BRIEF DESCRIPTION

Aspects and advantages of the invention will be set forth in part in the following description, or may be obvious from the description, or may be learned through practice of the invention.

In one exemplary aspect of the present disclosure, a method is provided of operating a fuel oxygen reduction unit for a vehicle or a gas turbine engine of the vehicle, the fuel oxygen reduction unit including a contactor and a fuel gas separator, and further defining a stripping gas flowpath in flow communication with a stripping gas inlet of the contactor and a stripping gas outlet of the fuel gas separator. The method includes receiving data indicative of a parameter of a stripping gas flow through the stripping gas flowpath or of a component in flow communication with the stripping gas flow through the stripping gas flowpath; and determining an operability condition of the fuel oxygen reduction unit, or a component operable with the fuel oxygen reduction unit, based on the data received indicative of the parameter of the stripping gas flow or of the component in flow communication with the stripping gas flow.

In certain exemplary aspects receiving data indicative of the parameter of the stripping gas flow or of the component in flow communication with the stripping gas flow includes receiving data indicative of an oxygen level of the stripping gas flow through the stripping gas flowpath.

For example, in certain exemplary aspects receiving data indicative of the oxygen level of the stripping gas flow through the stripping gas flowpath includes sensing data indicative of an oxygen level of the stripping gas flow through the stripping gas flowpath with an oxygen sensor positioned in flow communication with the stripping gas flowpath.

In certain exemplary aspects receiving data indicative of the parameter of the stripping gas flow or of the component in flow communication with the stripping gas flow includes receiving data indicative of a makeup gas flow to the stripping gas flowpath.

For example, in certain exemplary aspects receiving data indicative of the makeup gas flow to the stripping gas flowpath includes sensing an amount of makeup gas provided to the stripping gas flowpath with a makeup gas sensor.

In certain exemplary aspects receiving data indicative of the parameter of the stripping gas flow or of the component in flow communication with the stripping gas flow includes receiving data indicative of at least one of a pressure of the stripping gas flow through the stripping gas flowpath, a temperature of the stripping gas flow through the stripping gas flowpath, or a flow rate of the stripping gas flow through the stripping gas flowpath.

In certain exemplary aspects receiving data indicative of the parameter of the stripping gas flow or of the component in flow communication with the stripping gas flow includes receiving a first set of data indicative of the parameter at a first location along the stripping gas flowpath and receiving a second set of data indicative of the parameter at a second location along the stripping gas flowpath.

For example, in certain exemplary aspects the fuel oxygen reduction unit includes a catalyst in flow communication with the stripping gas flowpath, and wherein the first location is upstream of the catalyst, and wherein the second location is downstream of the catalyst.

For example, in certain exemplary aspects the parameter is a temperature of the stripping gas flow.

For example, in certain exemplary aspects the first location is upstream of the gas boost pump, and wherein the second location is downstream of the gas boost pump.

For example, in certain exemplary aspects the parameter is a temperature of the stripping gas flow, a pressure of the stripping gas flow, or a combination of the two.

In certain exemplary aspects the stripping gas flowpath is a circulation gas flowpath extending from the stripping gas outlet of the fuel gas separator to the stripping gas inlet of the contactor, wherein the fuel oxygen reduction unit includes a catalyst in flow communication with the circulation gas flowpath, and wherein the method further includes: mixing within the contactor a received flow of liquid fuel with the flow of stripping gas through the circulation gas flowpath to generate a fuel/gas mixture; separating within the fuel gas separator the fuel/gas mixture back into the flow of stripping gas and the flow of liquid fuel and providing the separated flow of the stripping gas to the circulation gas flowpath; and reducing with the catalyst an oxygen content of the stripping gas flow through the stripping gas flowpath.

For example, in certain exemplary aspects reducing with the catalyst the oxygen content of the stripping gas flow through the stripping gas flowpath includes generating a byproduct, and wherein receiving data indicative of the parameter of the stripping gas flow or of the component in flow communication with the stripping gas flow includes receiving data indicative of the byproduct.

For example, in certain exemplary aspects determining the operability condition of the fuel oxygen reduction unit, or a component operable with the fuel oxygen reduction unit, includes indirectly determining a health parameter of the catalyst of the fuel oxygen reduction unit.

In certain exemplary aspects determining the operability condition of the fuel oxygen reduction unit, or a component operable with the fuel oxygen reduction unit, includes determining an oxygen level of a deoxygenated fuel flow from the fuel oxygen reduction unit.

In certain exemplary aspects the method further includes controlling operation of the vehicle or the gas turbine engine based on the determined operability condition of the fuel oxygen reduction unit.

In an exemplary embodiment of the present disclosure, a fuel oxygen reduction unit for a vehicle or an engine of the vehicle is provided. The fuel oxygen reduction unit includes a contactor defining a liquid fuel inlet, a stripping gas inlet, and a fuel/gas mixture outlet; a fuel gas separator defining an inlet in flow communication with the fuel/gas mixture outlet of the contactor, a liquid fuel outlet, and a stripping gas outlet, the fuel oxygen reduction unit defining a stripping gas flowpath in flow communication with the stripping gas inlet of the contactor and the stripping gas outlet of the fuel gas separator; and a controller including one or more processors and memory, the memory storing instructions that when executed by the one or more processors cause the controller to perform functions. The functions include: receiving data indicative of a parameter of a stripping gas flow through the stripping gas flowpath or of a component in flow communication with the stripping gas flow through the gas flowpath; and determining an operability condition of the fuel oxygen reduction unit, or the component operable with the fuel oxygen reduction unit, based on the data received indicative of the parameter of the stripping gas flow or of the component in flow communication with the stripping gas flow.

In certain exemplary embodiments the fuel oxygen reduction unit of further includes a sensor operably coupled to the circulation gas flowpath, wherein receiving data indicative of the parameter of the stripping gas flow or of the component in flow communication with the stripping gas flow includes receiving data from the sensor.

In certain exemplary embodiments the fuel oxygen reduction unit of further includes a makeup gas source in flow communication with the stripping gas flowpath, wherein receiving data indicative of the parameter of the stripping gas flow or of the component in flow communication with the stripping gas flow includes receiving data indicative of a flow of makeup gas from the makeup gas source to the stripping gas flowpath.

In certain exemplary embodiments the stripping gas flowpath is a circulation gas flowpath extending from the stripping gas outlet of the fuel gas separator to the stripping gas inlet of the contactor, wherein the fuel oxygen reduction unit includes a catalyst in flow communication with the circulation gas flowpath.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
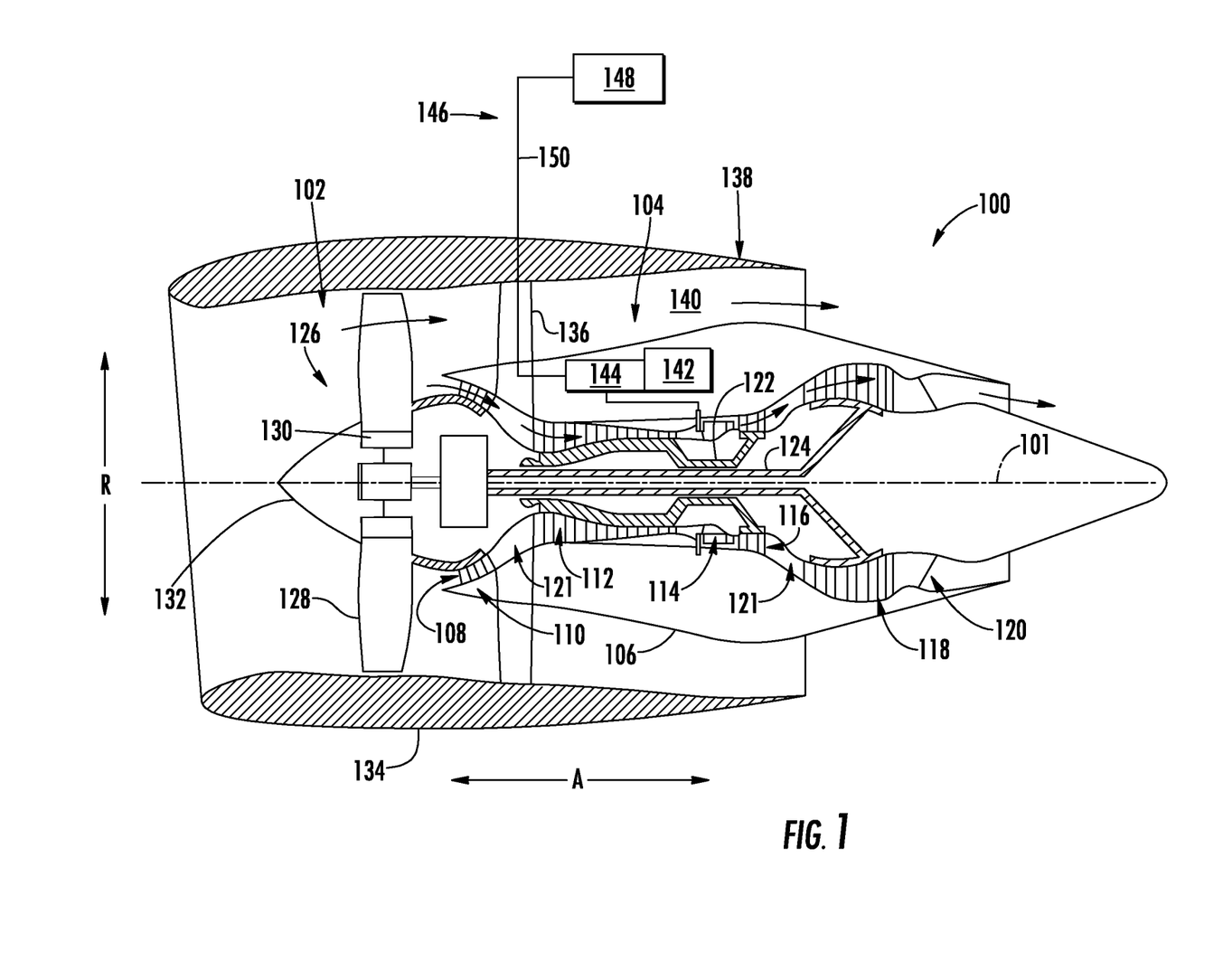
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen reduction unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen reduction unit 144 is coupled to, or otherwise rotatable with, the accessory gearbox 142. In such a manner, it will be appreciated that the exemplary fuel oxygen reduction unit 144 is driven by the accessory gearbox 142. Notably, as used herein, the term "fuel oxygen reduction" generally means a device capable of reducing a free oxygen content of the fuel, such as an oxygen conversion unit, an oxygen extraction unit, etc.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the fuel oxygen reduction unit 144 positioned within the turbomachine 104, i.e., within the casing 106 of the turbomachine 104, in other embodiments, the fuel oxygen reduction unit 144 may be positioned at any other suitable location. For example, in other embodiments, the fuel oxygen reduction unit 144 may instead be positioned remote from the turbofan engine 100, such as proximate to, or within, the tank of the fuel delivery system 146. Additionally, in other embodiments, the fuel oxygen reduction unit 144 may additionally or alternatively be driven by other suitable power sources such as an electric motor, a hydraulic motor, or an independent mechanical coupling to the HP or LP shaft, etc.

Figure 2:
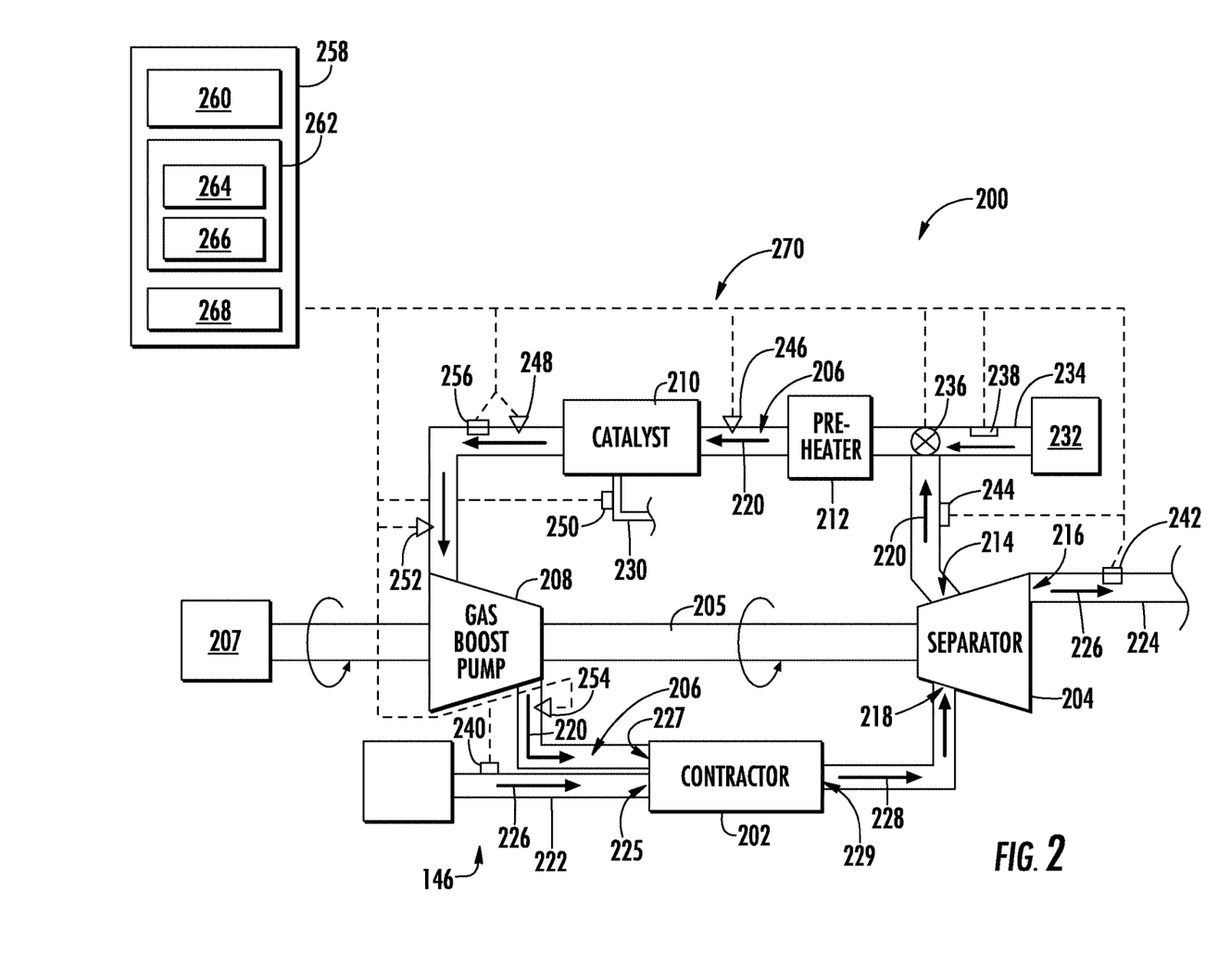
FIG. 2 is a schematic view of a fuel oxygen reduction unit in accordance with an exemplary embodiment of the present disclosure.

Referring now to FIG. 2, schematic drawing of a fuel oxygen reduction unit 200 for a vehicle (such as an aeronautical vehicle) or a gas turbine engine, e.g., of a vehicle in accordance with an exemplary aspect of the present disclosure is provided. In at least certain exemplary embodiments, the exemplary fuel oxygen reduction unit 200 depicted in FIG. 2 may be incorporated into, e.g., the exemplary engine 100 described above with reference to FIG. 1 (e.g., may be the fuel oxygen reduction unit 144 depicted in FIG. 1 and described above).

As will be appreciated from the discussion herein, the fuel oxygen reduction unit 200 of FIG. 2 generally includes a contactor 202 and a fuel gas separator 204. The exemplary contactor 202 depicted may be configured in any suitable manner to substantially mix a received gas and liquid flow, as will be described below. For example, the contactor 202 may be a mechanically-driven contactor (e.g., having paddles for mixing the received flows), or alternatively may be a passive contactor using, e.g., a pressure and/or flowrate of the received gas and liquid to mix the two fluids. For example, a passive contactor may include one or more tabulators, a venturi mixer, etc.

Moreover, the exemplary fuel oxygen reduction unit 200 defines a stripping gas flowpath in flow communication with a gas inlet 227 (discussed below) of the contactor 202 and a stripping gas outlet 214 (also discussed below) of the fuel gas separator 204. Specifically, for the embodiment depicted the stripping gas flowpath is a circulation gas flowpath 206 extending from the fuel gas separator 204 to the contactor 202. In certain exemplary embodiments, the circulation gas flowpath 206 may be formed of any combination of one or more conduits, tubes, pipes, etc., as well as structures of components within the circulation gas flowpath 206. Notably, however, in other exemplary embodiments the stripping gas flowpath may instead be an open loop flowpath in flow communication with a suitable stripping gas source.

As will be explained in greater detail, below, the fuel oxygen reduction unit 200 generally provides for a flow of stripping gas 220 through the stripping gas flowpath 206 during operation. It will be appreciated that the term "stripping gas" is used herein as a term of convenience to refer to a gas generally capable of performing the functions described herein. The stripping gas 220 flowing through the stripping gas flowpath/circulation gas flowpath 206 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide (CO2), a gas mixture made up of at least 50% by mass inert gas, or some other gas or gas mixture having a relatively low oxygen content.

Moreover, for the exemplary oxygen reduction unit depicted in FIG. 2, the fuel oxygen reduction unit 200 further includes a gas boost pump 208, a catalyst 210, and a pre-heater 212. For the embodiment shown, the gas boost pump 208, the catalyst 210, and the pre-heater 212 are each arranged within the circulation gas flowpath 206 in series flow. Additionally, the gas boost pump 208 is configured as a rotary gas pump mechanically coupled to, and driven by the fuel gas separator 204 through a mechanical connection 205. In such a manner, the gas boost pump 208 is rotatable with fuel gas separator 204. Further, it will be appreciated that for the embodiment depicted, the gas boost pump 208 and separator 204 are coupled to a power source 207, which in certain embodiments may be an accessory gearbox, or any other suitable power source (such as an electric machine).

However, in other embodiments, the gas boost pump 208 may be configured in any other suitable manner. For example, in other embodiments, the gas boost pump 208 may be mechanically disconnected from, and independently rotatable relative to, the fuel gas separator 204. For example, in certain embodiments, the gas boost pump 208 may be independently coupled to an accessory gearbox, or may be an electric pump electrically coupled to a suitable electrical power source. In such an embodiment, the gas boost pump 208 may rotate at a different rotational speed than the fuel gas separator 204.

Referring still to the embodiment of FIG. 2, it will be appreciated that the fuel gas separator 204 generally defines a gas outlet 214, a liquid fuel outlet 216, and an inlet 218. It will also be appreciated that the exemplary fuel oxygen reduction unit 200 depicted is operable with a fuel delivery system 146, such as a fuel delivery system 146 of the gas turbine engine including the fuel oxygen reduction unit 200 (see, e.g., FIG. 1). The exemplary fuel delivery system 146 generally includes a plurality of fuel lines, and in particular, an inlet fuel line 222 and an outlet fuel line 224. The inlet fuel line 222 is fluidly connected to the contactor 202 for providing a flow of liquid fuel 226 to a liquid fuel inlet 225 of the contactor 202 (e.g., from a fuel source, such as a fuel tank) and the outlet fuel line 224 is fluidly connected to the liquid fuel outlet 216 of the fuel gas separator 204 for receiving a flow of deoxygenated liquid fuel 226.

During typical operations, a stripping gas 220 flows from the gas outlet 214 of the fuel gas separator 204, through the circulation gas flowpath 206 in a direction from the fuel gas separator 204 to the contactor 202. More specifically, during typical operations, stripping gas 220 flows from the gas outlet 214 of the fuel gas separator 204, through the preheater 212 configured to add heat energy to the gas flowing therethrough, through the catalyst 210, and to the gas boost pump 208, wherein a pressure of the stripping gas 220 is increased to provide for the flow of the stripping gas 220 through the circulation gas flowpath 206. The relatively high pressure stripping gas 220 (i.e., relative to a pressure upstream of the boost pump 208 and the fuel entering the contactor 202) is then provided to a stripping gas inlet 227 of the contactor 202, wherein the stripping gas 220 is mixed with the flow of liquid fuel 226 from the inlet fuel line 222 to generate a fuel gas mixture 228. The fuel gas mixture 228 generated within the contactor 202 is provided from an outlet 229 of the contactor 202 to the inlet 218 of the fuel gas separator 204.

Notably, however, in other embodiments of the present disclosure, the components within the circulation gas flowpath 206 may be arranged in any other suitable flow order (e.g., boost pump 208 upstream of the catalyst 210), the fuel oxygen reduction unit 200 may include additional components in the circulation gas flowpath 206, or may not include each of the components depicted (e.g., one or more of such components may be combined, such as the pre-heater 212 and catalyst 210, or omitted).

Generally, it will be appreciated that during operation of the fuel oxygen reduction unit 200, the liquid fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the liquid fuel 226 is mixed with the stripping gas 220, resulting in the fuel gas mixture 228. As a result of such mixing a physical exchange may occur whereby at least a portion of the oxygen within the fuel 226 is transferred to the stripping gas 220, such that the fuel component of the mixture 228 has a relatively low oxygen content (as compared to the fuel 226 provided through inlet fuel line 222) and the stripping gas component of the mixture 228 has a relatively high oxygen content (as compared to the stripping gas 220 provided through the circulation gas flowpath 206 to the contactor 202).

Within the fuel gas separator 204 the relatively high oxygen content stripping gas 220 is then separated from the relatively low oxygen content fuel 226. Notably, for the embodiment depicted, the fuel gas separator 204 is a mechanical-fuel gas separator, and more specifically is a rotary fuel gas separator. In such a manner, it will be appreciated that the fuel gas separator 204 includes one or more components rotatable about a central axis. For example, the fuel gas separator may include one or more paddles configured to centrifuge relatively heavy liquid fuel 226 radially outward, while allowing relatively light stripping gas 220 to flow radially inward. In such a manner, the fuel gas separator 204 may separate the fuel/gas mixture 228 provided thereto back into the flow of liquid fuel 226 and the flow of stripping gas 220. Specifically, in such a manner, the liquid fuel 226 may exit through the liquid fuel outlet 216 of the fuel gas separator 204 and the stripping gas 220 may exit through the gas outlet 214 of the fuel gas separator 204, as is indicated.

Accordingly, it will be appreciated that the liquid fuel 226 provided to the liquid fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 226 provided to the liquid fuel outlet 216 may an oxygen content of less than about five (5) parts per million ("ppm"), such as less than about three (3) ppm, such as less than about two (2) ppm, such as less than about one (1) ppm, such as less than about 0.5 ppm.

Further, as will be appreciated, the exemplary fuel oxygen reduction unit 200 depicted recirculates and reuses the stripping gas 220 (i.e., the stripping gas 220 operates in a substantially closed loop such that the stripping gas path is configured as the "circulation" gas path 206). However, the stripping gas 220 exiting the fuel gas separator 204, having interacted with the liquid fuel 226, may have a relatively high oxygen content. Accordingly, in order to reuse the stripping gas 220, an oxygen content of the stripping gas 220 from the outlet 214 of the fuel gas separator 204 may need to be reduced. For the embodiment depicted, and as noted above, the stripping gas 220 flows through the pre-heater 212 and the catalyst 210, before reaching the gas boost pump 208. Within the catalyst 210, the oxygen content of the stripping gas 220 may be reduced. More specifically, within the catalyst 210 the relatively oxygen-rich stripping gas 220 may be reacted to reduce the oxygen content thereof.

It will be appreciated that catalyst 210 may be configured in any suitable manner to perform such functions. For example, in certain embodiments, the catalyst 210 may be configured to combust the relatively oxygen-rich stripping gas 220 to reduce an oxygen content thereof. However, in other embodiments, the catalyst 210 may additionally, or alternatively, include geometries of catalytic components through which the relatively oxygen-rich stripping gas 220 flows to reduce an oxygen content thereof. In one or more of these embodiments, the catalyst 210 may be configured to reduce an oxygen content of the stripping gas 220 to less than about three percent (3%) oxygen ($O_2$) by mass, such less than about one percent (1%) oxygen ($O_2$) by mass.

The resulting relatively low oxygen content stripping gas 220 is then provided through the remainder of the circulation gas flowpath 206 and back to the contactor 202, such that the cycle may be repeated. In such a manner, it will be appreciated that the stripping gas 220 may be any suitable gas capable of undergoing the chemical transitions described above. For example, the stripping gas may be air from, e.g., a core air flowpath of a gas turbine engine including the fuel oxygen reduction unit 200 (e.g., compressed air bled from an HP compressor 112; see FIG. 1). However, in other embodiments, the stripping gas may instead be any other suitable gas, such as an inert gas, such as Nitrogen or Carbon Dioxide ($CO_2$), a gas mixture made up of at least 50% by mass inert gas, or some other gas or gas mixture having a relatively low oxygen content.

Further, it will be appreciated that in certain exemplary embodiments, the reaction of the stripping gas 220 within the catalyst 210 may chemically transform at least a portion of the stripping gas 220, leaving certain byproducts of such reaction. For example, in certain exemplary embodiments, the stripping gas 220 may be reacted to result in carbon dioxide ($CO_2$) and a water ($H_2O$) byproduct. For the embodiment depicted, the fuel oxygen reduction unit 200 further includes a byproduct outlet line 230 fluidly connected to the catalyst 210 for removing, e.g., the water ($H_2O$) or other byproduct from the catalyst 210. However, in other embodiments, any other suitable byproduct may be produced, or alternatively, no byproduct may be produced.

Briefly, it will also be appreciated that the exemplary fuel oxygen reduction unit 200 depicted includes a makeup gas source 232 fluidly connected to the circulation gas flowpath 206 through a makeup gas line 234. The makeup gas source 232 may be any suitable gas source. For example, in certain embodiments, the makeup gas source 232 may be a compressor section of a gas turbine engine including the fuel oxygen reduction unit 200, such as a high pressure compressor 112 of such compressor section (see FIG. 1). Additionally, or alternatively, the makeup gas source 232 may be a gas tank located within the gas turbine engine, or alternatively, located remotely from the gas turbine engine, such as within the aircraft. Notably, in embodiments wherein the stripping gas path is an open loop path, the makeup gas source 232 may provide substantially all of the stripping gas for the fuel oxygen reduction unit 200 and the stripping gas path may exhaust the used stripping gas, e.g., to atmosphere downstream of the fuel gas separator 204.

Referring still to the embodiment depicted, the makeup gas source 232, or rather, the makeup gas line 234, is in airflow communication with the circulation gas flowpath 206 through a variable flow valve 236, which may be actuatable to supply additional gas to the circulation gas flowpath 206 as needed. The makeup gas may be necessary to ensure a desired amount of stripping gas is present within the circulation gas flowpath 206 during operations. For example, an at least certain exemplary embodiments, a volume of the stripping gas 220 within the circulation gas flowpath 206 may be reduced during typical operations, as evidenced by, e.g., the byproducts produced in the catalyst 210. Additionally, or alternatively, stripping gas 220 may leave the fuel oxygen reduction unit 200 through one or more leaks, through the liquid fuel outlet 216 of the fuel gas separator 204 (e.g., when the separator 204 is not operating at peak efficiency), etc.

Referring still to the exemplary fuel oxygen reduction unit 200 depicted in FIG. 2, it will be appreciated that the fuel oxygen reduction unit 200 includes a series of sensors for sensing data indicative of various parameters of the fuel oxygen reduction.

For example, the fuel oxygen reduction unit 200 includes a first, makeup gas sensor 238 in operable communication with the makeup gas line 234 extending from the makeup gas source 232 to the variable flow valve 236. The makeup gas sensor 238 may be configured to sense data indicative of various parameters of a makeup gas flow through the makeup gas line 234. For example, the makeup gas sensor 238 may be configured to sense data indicative of a flow rate of such makeup gas flow, a pressure of such makeup gas flow, a temperature of such makeup gas flow, etc.

Additionally, the exemplary fuel oxygen reduction unit 200 includes a plurality of fuel line sensors. More specifically, the exemplary fuel oxygen reduction unit 200 includes an inlet fuel line sensor 240 operably connected to the liquid fuel inlet line 222 and an outlet fuel line sensor 242 operably connected to the liquid fuel outlet line 224. The inlet fuel line sensor 240 and outlet fuel line sensor 242 may be configured to sense data indicative of one or more parameters of the liquid fuel 226 flowing through the inlet liquid fuel inlet line 222 and liquid fuel outlet line 224. For example, the inlet fuel line sensor 240 and outlet fuel line sensor 242 may be configured to sense data indicative of a temperature of such liquid fuel 226, a pressure such liquid fuel 226, a flow rate of such liquid fuel 226, an oxygen level of such liquid fuel 226, a gas content of such liquid fuel 226, etc.

Further, the exemplary fuel oxygen reduction unit 200 includes a plurality of sensors operably connected to the stripping gas flowpath, and more specifically to the circulation gas flowpath 206 and/or one or more components within or otherwise in fluid communication with the circulation gas flowpath 206. For example, for the embodiment of FIG. 2, the fuel oxygen reduction unit 200 includes a first flowpath sensor 244 operably connected to the circulation gas flowpath 206 for sensing one or more parameters of the stripping gas 220 flow through the circulation gas flowpath 206. Specifically, the first flowpath sensor 244 is, for the embodiment shown, an oxygen level sensor positioned immediately downstream of the fuel gas separator 204 (i.e., downstream of the fuel gas separator 204 and upstream of the variable flow valve 236, the pre-heater 212, the catalyst 210, and, for the embodiment shown, the gas boost pump 208). The oxygen level sensor/first flowpath sensor 244 is configured to sense data indicative of an oxygen content of the stripping gas 220 flow through the circulation gas flowpath 206 immediately downstream of the fuel gas separator 204.

Additionally, the exemplary fuel oxygen reduction unit 200 of FIG. 2 further includes a second flowpath sensor 246 operably connected to the circulation gas flowpath 206 at a location immediately upstream of the catalyst 210 and a third flowpath sensor 248 operably connected to the circulation gas flowpath 206 at a location immediately downstream of the catalyst 210. The second flowpath sensor 246 and third flowpath sensor 248 may each be configured to sense data (or respective data sets) indicative of one or more parameters of the stripping gas 220 flow through the circulation gas flowpath 206 at their respective locations. In such a manner, the second flowpath sensor 246 and third flowpath sensor 248 may be utilized to sense a change in the parameter across the catalyst 210. For example, in certain exemplary embodiments, the second flowpath sensor 246 and third flowpath sensor 248 may be configured to sense data indicative of a temperature of the stripping gas 220 flow, a pressure of the stripping gas 220 flow, a flow rate of the stripping gas 220, a pressure of the stripping gas 220, etc.

Furthermore, the exemplary fuel oxygen reduction unit 200 includes a fourth flowpath sensor 250, which for the embodiment shown is operably connected to the byproduct outlet line 230. The fourth flowpath sensor 250 may accordingly sense data indicative of a parameter (e.g., flowrate, pressure, etc.) of the byproduct flowing through the byproduct outlet line 230 (and, therefore, indirectly, data indicative of a parameter of the stripping gas 220 flow through the circulation gas flowpath 206).

Similarly, the exemplary fuel oxygen reduction unit 200 of FIG. 2 includes a fifth flowpath sensor 252 and a sixth flowpath sensor 254, each operably connected to the circulation gas flowpath 206 at a location immediately upstream of the gas boost pump 208 and immediately downstream of the gas boost pump 208, respectively. The fifth flowpath sensor 252 and sixth flowpath sensor 254 may accordingly be configured to sense data (or respective datasets) indicative of one or more parameters of the stripping gas 220 flow through the circulation gas flowpath 206 at their respective locations, and further to sense data indicative of a change in the parameter across the gas boost pump 208. In at least certain exemplary embodiments, the fifth flowpath sensor 252 and sixth flowpath sensor 254 may be configured to sense data indicative of a temperature of the stripping gas 220 flow, a pressure of the stripping gas 220 flow, a flow rate of the stripping gas 220, etc.

Moreover, the exemplary fuel oxygen reduction unit 200 includes a seventh flowpath sensor 256 also operably connected to the circulation gas flowpath 206, for the embodiment depicted, downstream of the catalyst 210 and upstream of the gas boost pump 208. The seventh flowpath sensor 256 may be configured to sense data indicative of one or more parameters of the stripping gas 220 flow through the circulation gas flowpath 206 at such location, such as one or more of a temperature, pressure, flow rate, oxygen level, etc. of the stripping gas 220 flow at such location.

It will be appreciated, however, that in other embodiments, any other suitable number and/or configuration of sensors may be provided.

Further, for the embodiment shown, the fuel oxygen reduction unit 200 includes, or is otherwise operable with, a control system. The control system generally includes a controller 258. The exemplary controller 258 depicted includes one or more processor(s) 260 and one or more memory device(s) 262. The one or more processor(s) 260 can include any suitable processing device, such as a microprocessor, microcontroller 258, integrated circuit, logic device, and/or other suitable processing device. The one or more memory device(s) 262 can include one or more computer-readable media, including, but not limited to, non-transitory computer-readable media, RAM, ROM, hard drives, flash drives, and/or other memory devices.

The one or more memory device(s) 262 can store information accessible by the one or more processor(s) 260, including computer-readable instructions 264 that can be executed by the one or more processor(s) 260 and data 266. The instructions 264 can be any set of instructions that when executed by the one or more processor(s) 260, cause the one or more processor(s) 260 to perform operations. In some embodiments, the instructions 264 can be executed by the one or more processor(s) 260 to cause the one or more processor(s) 260 to perform operations, such as any of the operations and functions for which the computing system and/or the controller 258 are configured, the operations for operating a fuel oxygen reduction unit 200 (e.g., method 300), as described herein, and/or any other operations or functions. The instructions 264 can be software written in any suitable programming language or can be implemented in hardware. Additionally, and/or alternatively, the instructions 264 can be executed in logically and/or virtually separate threads on processor(s) 260. Additionally, as noted above, the memory device(s) 262 can further store data 266 that can be accessed by the processor(s) 260, such as data from the various sensors, as explained below.

The exemplary controller 258 depicted also includes a network interface 268 and a communication network 270, the network interface 268 used to communicate, for example, with the components of the fuel oxygen reduction unit 200 via the communication network 270, which is configured as a wireless communication network 270 for the embodiment shown (although in other embodiments, the communication network 270 may instead be a wired communication network, or include some combination of wired and wireless communications networks). The network interface 268 can include any suitable components for interfacing with one or more network(s), including for example, transmitters, receivers, ports, controllers, antennas, and/or other suitable components.

Specifically, it will be appreciated that the controller 258 is operably connected to the various sensors of the fuel oxygen reduction unit 200 described herein through the network interface 268 and communication network 270, for the embodiment shown. Specifically, the controller 258 is operably connected to each of the sensors 240-254, described above, through the network interface 268 and the communication network 270. In such a manner, the controller 258 may be configured to receive sensed data (e.g., received and stored as data 266) indicative of the various parameters of a stripping gas 220 flow through the circulation gas flowpath 206, of one or more components in flow communication with the stripping gas 220 flow through the circulation gas flowpath 206, etc.

It will be appreciated, that in such a manner, the controller 258 may be configured to determine an operability condition of the fuel oxygen reduction unit 200 using the sensed data from the sensors 240-254 with which it is operably connected. For example, in certain exemplary embodiments, the controller 258 may be configured to sense data indicative of a flow rate of the stripping gas 220 flow through the stripping gas flowpath 206. The flow rate of the stripping gas 220 flow through the circulation gas flowpath 206 may indicate how efficient the fuel oxygen reduction unit 200 is operating. For example, a higher flow rate of stripping gas 220 flow through the circulation gas flowpath 206 may indicate that the fuel oxygen reduction unit 200 is operating at a relatively high operability, as a relatively large amount stripping gas 220 is reacting with the liquid fuel 226 flow within the contactor 202.

Additionally, or alternatively, the one or more sensors may sense data indicative of a temperature and/or pressure change of the stripping gas 220 flow through the circulation gas flowpath 206 across the catalyst 210, across the gas boost pump 208, or both. Such a temperature and/or pressure change again may indicate an effectiveness/operability of the fuel oxygen reduction unit 200. For example, a relatively high temperature rise across the catalyst 210 may indicate that the catalyst 210 is effectively reacting the stripping gas 220 flowing therethrough and therefore effectively reducing an oxygen content of such stripping gas 220 flowing therethrough. Such may, in turn, indicate a relatively high efficiency/operability of the fuel oxygen reduction unit 200. Similarly, a relatively high pressure change across the gas boost pump 208 may indicate a relatively high flow rate of stripping gas 220 through the circulation gas flowpath 206, which may indicate that the fuel oxygen reduction unit 200 is operating at a relatively high efficiency/operability.

Additionally, or alternatively still, in other embodiments, such as the embodiment depicted, the one or more sensors may sense data indicative of the byproduct flowing from the catalyst 210 (e.g., a temperature, pressure, flowrate, etc.). Such data may similarly indicate an effectiveness/operability of the catalyst 210, which in turn may indicate an effectiveness/operability of the fuel oxygen reduction unit 200. For example, when a relatively large amount of byproduct is flowing from the catalyst 210, such may indicate that a relatively large amount of oxygen is being removed from the stripping gas 220 flowing through the catalyst 210, in turn indicating that the stripping gas 220 is extracting a relatively large amount of oxygen from the liquid fuel 226 flowing to the fuel oxygen reduction unit 200.

Further, still, in other embodiments, the controller 258 may additionally, or alternatively, sense data indicative of a makeup gas flow to the circulation gas flowpath 206. A pressure, flowrate, or both, of such makeup gas flow to the stripping gas flow path 206 may similarly indicate an effectiveness/operability of the fuel oxygen reduction unit 200. For example, a high flow rate of a gas being provided to the circulation gas flowpath 206 may indicate a leak or other damage condition of the fuel oxygen reduction unit 200, a low operability of the fuel gas separator 204, etc.

Further, with one or more of the above exemplary embodiments, it will be appreciated that the determined operability of the fuel oxygen reduction unit 200 may in turn be utilized to determine an estimated oxygen level of the liquid fuel 226 provided from the fuel gas separator 204 to the fuel outlet line 224. For example, although the exemplary system of FIG. 2 includes the outlet fuel line sensor 242 which may be configured to directly sense data indicative of an oxygen level of the liquid fuel 226 through the fuel outlet line 224 by using the sensed data from the one or more other sensors, the controller 258 may confirm the oxygen level sensed using the outlet fuel line sensor 242 is accurate and that such outlet fuel line sensor 242 is not malfunctioning. Such information may be used to influence control decisions of the gas turbine engine, vehicle, or both.

Briefly, it will be appreciated that the inherent flexibility of computer-based systems and controllers, however, allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3:
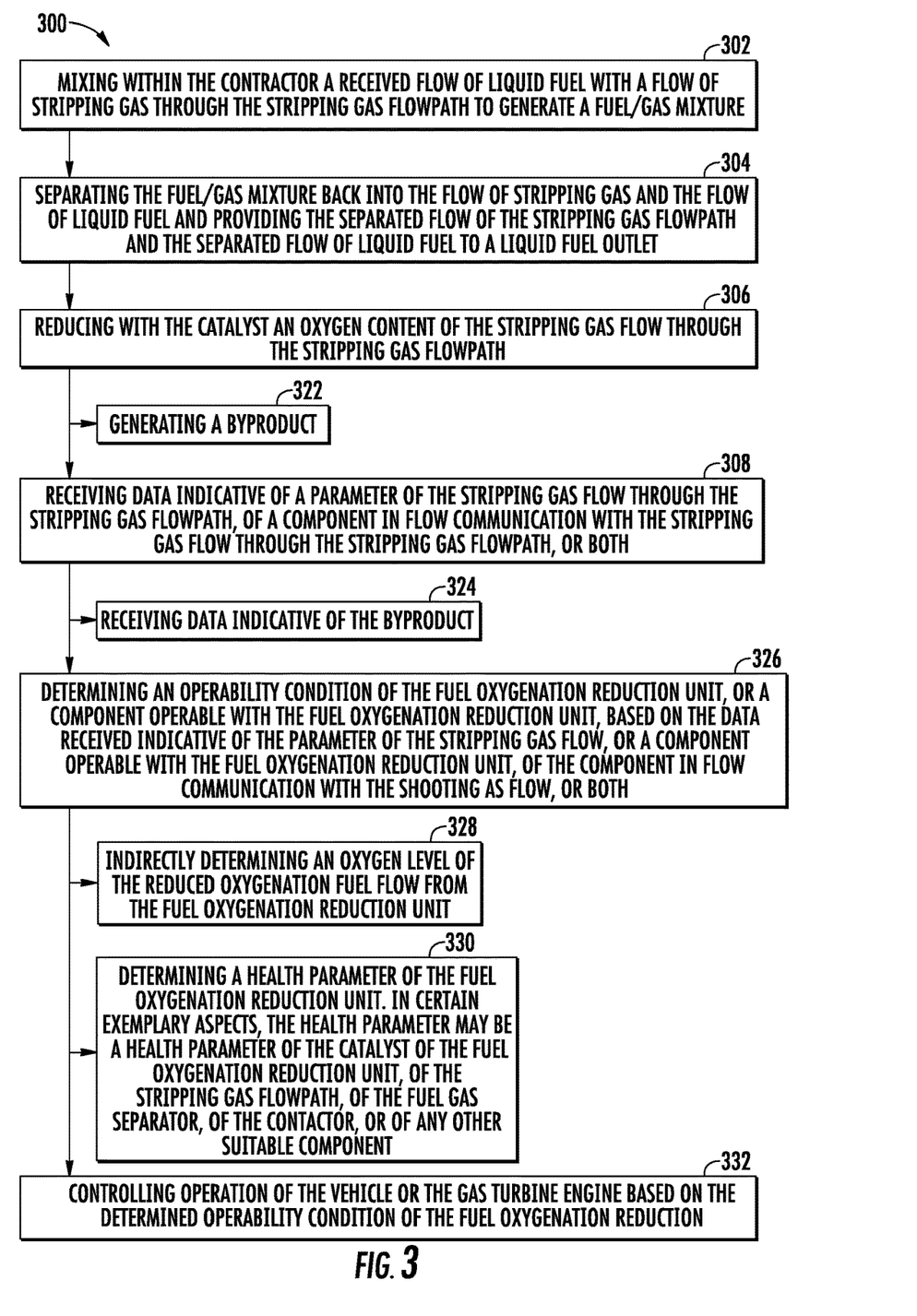
FIG. 3 is a flow diagram of a method for operating a fuel oxygen reduction unit in accordance with an exemplary aspect of the present disclosure.

Referring now to FIG. 3, a method 300 of operating a fuel oxygen reduction unit for a vehicle or a gas turbine engine of the vehicle is provided. In certain example aspects, the method 300 may be utilized to operate one or more of the exemplary fuel oxygen reduction units described above with reference to FIGS. 1 and 2. Accordingly, the exemplary fuel oxygen reduction unit operated by the method 300 may generally define a stripping gas flowpath and may generally include a contactor and a fuel gas separator in flow communication with the stripping gas flowpath. Additionally, in certain exemplary aspects, the method 300 may be executed using a suitable control system.

For the exemplary method 300 depicted in FIG. 3, the method 300 includes at (302) mixing within the contactor a received flow of liquid fuel with a flow of stripping gas through the stripping gas flowpath to generate a fuel/gas mixture. As will be appreciated from the discussion of the embodiments above, mixing the liquid fuel with the flow of stripping gas at (302) may allow the liquid fuel to react with the stripping gas, thereby reducing an oxygen level within the fuel component of the fuel/gas mixture. The method 300 further includes at (304) separating the fuel/gas mixture back into the flow of stripping gas and the flow of liquid fuel and providing the separated flow of the stripping gas to the stripping gas flowpath and the separated flow of liquid fuel to a liquid fuel outlet. It will further be appreciated from the discussion above, that at such point, the separated stripping gas provided to the stripping gas flowpath may have a relatively high oxygen content. Further, for the exemplary aspect depicted, the stripping gas flowpath is configured as a circulation gas flowpath and the fuel oxygen reduction unit further includes a catalyst. With such a configuration, the method 300 may reuse the stripping gas from the fuel gas separator. In order to reuse such flow of stripping gas, the method 300 further includes at (306) reducing with the catalyst an oxygen content of the stripping gas flow through the stripping gas flowpath.

Further, the method 300 of FIG. 3 includes at (308) receiving data indicative of a parameter of the stripping gas flow through the stripping gas flowpath, of a component in flow communication with the stripping gas flow through the stripping gas flowpath, or both.

Figure 4:
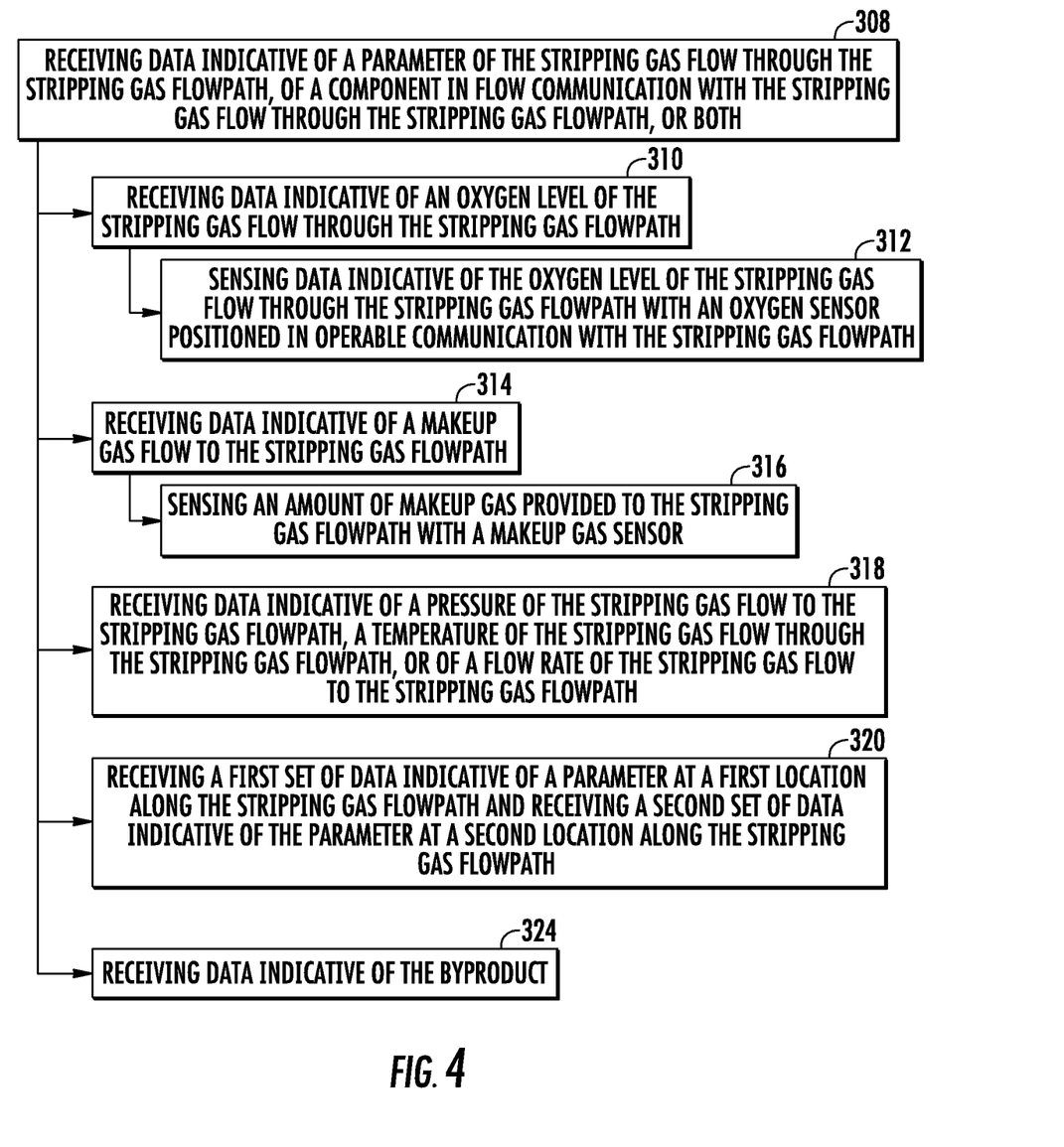
FIG. 4 is a flow diagram of various exemplary aspects of receiving data indicative of a parameter of the exemplary method of FIG. 3.

Referring now briefly to FIG. 4, a flow chart is provided of various exemplary aspects of receiving data indicative of the parameter at (308).

As is depicted in FIG. 4, in one exemplary aspect, receiving data indicative of the parameter of the stripping gas flow, of the component in flow communication with the stripping gas flow, or both at (308) includes at (310) receiving data indicative of an oxygen level of the stripping gas flow through the stripping gas flowpath. More specifically, for the exemplary aspect depicted, receiving data indicative of the oxygen level of the stripping gas flow through the stripping gas flowpath at (310) includes at (312) sensing data indicative of the oxygen level of the stripping gas flow through the stripping gas flowpath with an oxygen sensor positioned in operable communication with the stripping gas flowpath. For example, the sensor may be an oxygen sensor positioned directly within the stripping gas flowpath, e.g., immediately downstream of the fuel gas separator, upstream of the catalyst, downstream of the catalyst, upstream of the contactor and downstream of the gas boost pump, or at any other suitable location.

In another exemplary aspect of the present disclosure, receiving data indicative of the parameter of the stripping gas flow, of the component in flow communication with the stripping gas flow, or both at (308) includes at (314) receiving data indicative of a makeup gas flow to the stripping gas flowpath. More specifically, for the exemplary aspect depicted, receiving data indicative of a makeup gas flow to the stripping gas flowpath at (314) includes at (316) sensing an amount of makeup gas provided to the stripping gas flowpath with a makeup gas sensor. In such a manner, the method 300 may determine, e.g., a leakiness of the stripping gas flowpath, a consumption of the stripping gas flow, an effectiveness of the fuel gas separator (e.g., how much stripping gas is remaining in the liquid fuel provided to the liquid fuel outlet of the fuel gas separator), etc.

In yet another exemplary aspect of the present disclosure, receiving data indicative of the parameter of the stripping gas flow, of the component in flow communication with the stripping gas flow, or both at (308) includes at (318) receiving data indicative of a pressure of the stripping gas flow to the stripping gas flowpath, a temperature of the stripping gas flow through the stripping gas flowpath, or of a flow rate of the stripping gas flow to the stripping gas flowpath. For example, in certain exemplary aspects, receiving such data at (318) may include sensing such data through one or more temperature sensors, pressure sensors, flow rate sensors, etc. The temperature, pressure, and/or flow rate of the stripping gas flow through the stripping gas flowpath may individually, or through some combination, relate to an effectiveness or operability of the fuel oxygen reduction unit.

In still another exemplary aspect of the present disclosure, receiving data indicative of the parameter of the stripping gas flow, of the component in flow communication with the stripping gas flow, or both at (308) includes at (320) receiving a first set of data indicative of the parameter at a first location along the stripping gas flowpath and receiving a second set of data indicative of the parameter at a second location along the stripping gas flowpath. In certain exemplary aspects, the first location may be upstream of a component within or operable with the stripping gas flowpath, and the second location may be downstream of such components. For example, in certain exemplary aspects, the first location may be upstream of the catalyst and a second location may be downstream of the catalyst. With such an exemplary aspect, the parameter may be a temperature of the stripping gas flow, the temperature of the stripping gas flow across the catalyst indicating an effectiveness and/or operability of the catalyst. Additionally, or alternatively, in certain exemplary aspects, the first location may be upstream of the gas boost pump and the second location may be downstream of the gas boost pump. With such an exemplary aspect, the parameter may be a temperature of the stripping gas flow, a pressure of the stripping gas flow, or a combination of the two.

Referring now back to FIG. 3, in further still exemplary aspects of the present disclosure, it will be appreciated that reducing with the catalyst the oxygen content of the stripping gas flow through the stripping gas flowpath at (306) includes at (322) generating a byproduct. The byproduct may be, e.g., water (H2O), or any other suitable byproduct. With such an exemplary aspect, receiving data indicative of the parameter of the stripping gas flow, of the component in flow communication with the stripping gas flow, or both at (308) may include at (324) receiving data indicative of the byproduct. For example, the data received indicative of the byproduct at (324) may be, e.g., a flow rate of the byproduct, a temperature of the byproduct, a pressure of the byproduct, etc. One or more these parameters of the byproduct may indicate an operability of the catalyst, which in turn may indicate an operability of the fuel oxygen reduction unit.

Referring still to FIG. 3, the exemplary method 300 includes at (326) determining an operability condition of the fuel oxygen reduction unit, or a component operable with the fuel oxygen reduction unit, based on the data received indicative of the parameter of the stripping gas flow, of the component in flow communication with the shooting as flow, or both at (308).

The operability condition of the fuel oxygen reduction unit may refer to how efficiently the fuel oxygen reduction unit is operating. Accordingly, for example, in certain exemplary aspects, determining the operability condition of the fuel oxygen reduction unit, or the component operable with the fuel oxygen reduction unit, at (326) may include at (328) indirectly determining an oxygen level of the deoxygenated fuel flow from the fuel oxygen reduction unit (e.g., of the fuel flow from a liquid fuel outlet of the fuel gas separator of the fuel oxygen reduction unit). More specifically, the parameter referenced in (308) may indicate how efficiently the fuel oxygen reduction unit, or a component thereof, is operating, and based on the indicated efficiency of the fuel oxygen reduction unit, the oxygen level of the deoxygenated fuel may be determined at (328). For example, in one nonlimiting example, the data received at (308) may be indicative of a temperature rise across the catalyst, and the temperature rise across the catalyst may indicate, e.g., an amount of combustion within the catalyst, which may in turn indicate how much of the relatively oxygen rich stripping gas provided through an inlet of the catalyst is converted to relatively low oxygen content stripping gas by the time it exits through an outlet of the catalyst. Such information may then be utilized to estimate (i.e., indirectly determine) the oxygen level of the fuel flowing from the liquid fuel outlet of the fuel gas separator of the fuel oxygen reduction.

Notably, in certain exemplary aspects, in addition to indirectly determining the oxygen level of the oxygen reduction fuel flow from the fuel oxygen reduction unit at (328), determining the operability condition of the fuel oxygen reduction unit, or the component operable with the fuel oxygen reduction unit, at (326) may include directly determining the oxygen level of the oxygen reduction fuel flow from the fuel oxygen reduction unit using, e.g., an oxygen sensor operable with the fuel flow downstream of the fuel gas separator of the fuel oxygen reduction unit. In such an exemplary aspect, determining the operability condition of the fuel oxygen reduction unit, or the component operable with the fuel oxygen reduction unit, at (326) may further include comparing the indirectly determined oxygen level at (328) with the directly determined oxygen level to determine an operability of the oxygen sensor operable with the fuel flow, and/or of the indirect sensing techniques. In such a manner, it will be appreciated that the operability condition determined at (326) may relate to the operability of an oxygen sensor operable with the fuel flow downstream of the fuel oxygen reduction unit (i.e., a component operable with the fuel oxygen reduction unit).

In another exemplary aspect of the present disclosure, however, determining the operability condition of the fuel oxygen reduction unit, or the component operable with the fuel oxygen reduction unit, at (326) may include at (330) determining a health parameter of the fuel oxygen reduction unit. In certain exemplary aspects, the health parameter may be a health parameter of the catalyst of the fuel oxygen reduction unit, of the stripping gas flowpath, of the fuel gas separator, of the contactor, or of any other suitable component. For example, in one nonlimiting example, the data received at (308) may be indicative of a temperature rise across the catalyst. A relatively low temperature rise across the catalyst, without other extenuating circumstances, may indicate that there is a defect with the catalyst, that the catalyst needs to be replaced, etc. Similarly, in another nonlimiting example, the data received at (308) may be indicative of a flow of makeup gas provided to the stripping gas flowpath. When a relatively large amount makeup gas is indicated as being provided to the stripping gas flowpath, such may indicate that there is a leak or other defect with the stripping gas flowpath, or other component through which the flow of gas extends.

Having determined the operability condition of the fuel oxygen reduction unit, or the component operable with the fuel oxygen reduction unit, at (326), the method 300 may utilize such information elsewhere in a vehicle incorporating the fuel oxygen reduction unit, or a gas turbine engine incorporating the fuel oxygen reduction unit. Referring still to FIG. 3, for example, in certain exemplary aspects, the method 300 may further include at (332) controlling operation of the vehicle or the gas turbine engine based on the determined operability condition of the fuel oxygen reduction unit. For example, if it is determined that the fuel oxygen reduction unit is not operating at a desired efficiency, it is possible that an oxygen level within the fuel flow downstream of the fuel oxygen reduction unit is higher than necessary for accepting a desired amount of heat. In response, the method 300 may reduce a power level of the gas turbine engine so as to reduce an amount of heat generated by certain systems of the gas turbine engine which rely on the fuel flow as a heat sink.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a fuel oxygen reduction unit for a vehicle or a gas turbine engine of the vehicle,
    the fuel oxygen reduction unit comprising a catalyst, a contactor, and a fuel gas separator,
    and further defining a stripping gas flowpath in flow communication with the catalyst, a stripping gas inlet of the contactor, and a stripping gas outlet of the fuel gas separator,
    the method comprising:
        receiving data indicative of a parameter of a stripping gas flow through the stripping gas flowpath or of a component in flow communication with the stripping gas flow through the stripping gas flowpath; and
        determining an operability condition of the fuel oxygen reduction unit based on the data received indicative of the parameter of the stripping gas flow,
        wherein the operability condition is defined as an operational efficiency of the fuel oxygen reduction unit,
        wherein the receiving data indicative of the parameter of the stripping gas flow comprises receiving a first set of data indicative of the parameter at a first location along the stripping gas flowpath and receiving a second set of data indicative of the parameter at a second location along the stripping gas flowpath,
        wherein the first location is upstream of the catalyst, and
        wherein the second location is downstream of the catalyst.

2. The method of claim 1, wherein receiving data indicative of the parameter of the stripping gas flow comprises receiving data indicative of an oxygen level of the stripping gas flow through the stripping gas flowpath.

3. The method of claim 2, wherein receiving data indicative of the oxygen level of the stripping gas flow through the stripping gas flowpath comprises sensing data indicative of an oxygen level of the stripping gas flow through the stripping gas flowpath with an oxygen sensor positioned in flow communication with the stripping gas flowpath.

4. The method of claim 1, wherein receiving data indicative of the parameter of the stripping gas flow comprises receiving data indicative of a makeup gas flow to the stripping gas flowpath.

5. The method of claim 4, wherein receiving data indicative of the makeup gas flow to the stripping gas flowpath comprises sensing an amount of makeup gas provided to the stripping gas flowpath with a makeup gas sensor.

6. The method of claim 1, wherein receiving data indicative of the parameter of the stripping gas flow comprises receiving data indicative of at least one of a pressure of the stripping gas flow through the stripping gas flowpath, a temperature of the stripping gas flow through the stripping gas flowpath, or a flow rate of the stripping gas flow through the stripping gas flowpath.

7. The method of claim 1, wherein the parameter is a temperature of the stripping gas flow.

8. The method of claim 1, wherein the parameter is a temperature of the stripping gas flow, a pressure of the stripping gas flow, or a combination of the two.

9. The method of claim 1,
wherein the stripping gas flowpath is a circulation gas flowpath extending from the stripping gas outlet of the fuel gas separator to the stripping gas inlet of the contactor,
wherein the method further comprises:
mixing within the contactor a received flow of liquid fuel with the flow of stripping gas through the circulation gas flowpath to generate a fuel/gas mixture;
separating within the fuel gas separator the fuel/gas mixture back into the flow of stripping gas and the flow of liquid fuel and providing the separated flow of the stripping gas to the circulation gas flowpath; and
reducing with the catalyst an oxygen content of the stripping gas flow through the stripping gas flowpath.

10. The method of claim 9, wherein reducing with the catalyst the oxygen content of the stripping gas flow through the stripping gas flowpath comprises generating a byproduct, and wherein receiving data indicative of the parameter of the stripping gas flow comprises receiving data indicative of the byproduct.

11. The method of claim 9, wherein the determining the operability condition of the fuel oxygen reduction unit comprises indirectly determining a health parameter of the catalyst of the fuel oxygen reduction unit.

12. The method of claim 1, wherein the determining the operability condition of the fuel oxygen reduction unit comprises determining an oxygen level of a deoxygenated fuel flow from the fuel oxygen reduction unit.

13. The method of claim 1, further comprising:
controlling operation of the vehicle or the gas turbine engine of the vehicle based on the determined operability condition of the fuel oxygen reduction unit.

14. The method of claim 1, further comprising:
indicating that the catalyst needs to be replaced based on the operability condition.

15. The method of claim 1, further comprising:
indicating a leak in the stripping gas flowpath based on the operability condition.

16. The method of claim 1,
wherein the determining the operability condition of the fuel oxygen reduction unit is based on a difference between the first parameter at the first location and the second parameter at the second position.

* * * * *